Dec. 29, 1964     E. M. ERVIN     3,163,190
SELF-ADJUSTING INDEXING MEANS FOR TUBULAR SAW MACHINE
Filed May 31, 1963     7 Sheets-Sheet 2

INVENTOR,
EVANDER M. ERVIN
BY Watson, Cole, Grindle & Watson
ATTORNEYS Dec. 29, 1964    E. M. ERVIN    3,163,190
SELF-ADJUSTING INDEXING MEANS FOR TUBULAR SAW MACHINE
Filed May 31, 1963    7 Sheets-Sheet 3

INVENTOR,
EVANDER M. ERVIN
BY Watson, Cole, Grindle & Watson
ATTORNEYS

Dec. 29, 1964     E. M. ERVIN     3,163,190
SELF-ADJUSTING INDEXING MEANS FOR TUBULAR SAW MACHINE
Filed May 31, 1963     7 Sheets-Sheet 4

INVENTOR,
EVANDER M. ERVIN

BY Watson, Cole, Grindle & Watson
ATTORNEYS

United States Patent Office 3,163,190
Patented Dec. 29, 1964

3,163,190
SELF-ADJUSTING INDEXING MEANS FOR TUBULAR SAW MACHINE
Evander M. Ervin, Florence County, S.C., assignor to The Terrell Machine Company, Charlotte, N.C., a corporation of North Carolina
Filed May 31, 1963, Ser. No. 284,751
32 Claims. (Cl. 143—85)

This invention relates to improvements in a tubular sawing machine adapted for the production of wooden rounds or billets from rough logs.

In sawing machines of the class to which the present improvements are directed the tubular saw is supported for rotation on a stationary frame, while the log is supported for feeding movement parallel to the axis of the saw tube and for rotary indexing movement about an axis substantially displaced from but parallel to that of the saw tube. The log is positioned so that its major longitudinal axis substantially coincides with its indexing axis and so that each cut of the saw tube through the log is made at a location spaced radially outwardly from said axis, the log being indexed about its axis so that successive cuts may be made closely adjacent each other and in annular formation.

In prior sawing machines of this general type, some difficulty has been encountered in indexing the log in a manner to obtain the maximum number of cuts within a given ring of cuts. Further, some difficulty has been encountered in providing suitable escape passages or routes for the sawdust which is formed around the tube incident to the sawing operation, as well as in preventing accumulated sawdust within the saw tube from binding the rotation tube to the nonrotating billet being formed therein. In addition, considerable time has been consumed in accurately centering the log on its supports or work centers so that it may be properly indexed.

The present invention has been conceived with the foregoing in mind and has as its primary objects the provision of an improved indexing mechanism in association with a saw of this type; the provision of such indexing mechanism which is adapted to form the cuts in overlapping relation whereby the sawdust on each cut after the initial cut may escape into an immediately preceding cut, the intersecting relationship of the adjoining cuts at the same time permitting the maximum number of cuts to be made in a given ring; also it is an object to provide in conjunction with such a sawing machine a work feeding and mounting mechanism adapted to cooperate with said machine in a novel matter in supplying and mounting logs therein successively and in properly centered relationship.

Further objects are to provide a special formation at the toothed end of the saw tube adapted to minimize the passage of sawdust into the tube; to provide in a preferred embodimen a novel billet ejecting plunger which functions also as an air jet source to direct a jet of air through the saw tube for removing the sawdust therefrom during the return stroke of the plunger after it has ejected a completed billet from the saw tube; and in a preferred arrangement to provide such a combined ejecting plunger and air jet source which is adapted to direct through the saw tube a jet consisting of a mixture of air and a spray of oil or other lubricating substance to coat the inner surface of the saw tube and thereby to minimize the possibility of its binding on the billet next to be cut thereby.

A still further object is to provide in conjunction with such a dual functioning ejector plunger a novel mechanism for supplementing the action of the plunger in initiating the ejection of the completed billet from the saw tube while at the same time preventing rotation of the billet with the saw at least until its ejection movement has been commenced. In addition such a mechanism is adapted to function as a guide for the plunger.

In order that the maximum number of cuts may be made from a given log, it is necessary that the outermost ring of cuts be taken about a cylinder of maximum diameter encompassed within the log. The radius of such a cylinder or circle of cuts will therefore vary in accordance with the overall diameter of the log in which the cuts are made. Because of such variations in the diameters of the various rings of the nuts in different logs, it will be apparent that the angular extent or increment of indexing movement required to permit the maximum number of cuts in any given log adjacent its outer periphery will vary in accordance with the diameter of the log. In other words, the angular size of each increment of indexing movement will obviously decrease as the diameter of the circle of cuts increases, inasmuch as the diameters of the individual cuts or bores will remain normally constant.

Accordingly it is a further important object to provide means for automatically varying the size of the indexing increments in response to adjustment of the position of the log to vary the distance between its major axis and the axis about which the saw tube rotates.

Further incidental objects consist in the provision of means automatically actuated by the indexing mechanism for frictionally locking the said mechanism to maintain the angular position of adjustment of a log between indexing movements thereof.

Further objects and features of the invention will be apparent from the following description taken in connection with the accompanying drawings in which.

To promote an understanding of the invention, reference will now be made to the preferred embodiment thereof illustrated in the accompanying drawings and specific language will be used to describe same. It will nevertheless be appreciated that no limitation of the scope of the invention is thereby intended, but that such further modifications and alterations are contemplated as would normally occur to one skilled in the art to which the invention relates.

Referring now in detail to the accompanying drawings:

Referring first generally to the overall construction and combination of parts the tubular saw 10 itself is supported at one end only in cantilever fashion on the main stationary saw frame. This tubular saw or saw tube 10 is provided at its forwardly projecting free end with axially presented saw teeth 11, so that it will cut into a log W or other workpiece fed axially onto the saw tube, the tube being open at both ends so that the cutout round or billet B may pass completely through it and be discharged through its rear end.

Figures 4, 10, 11:
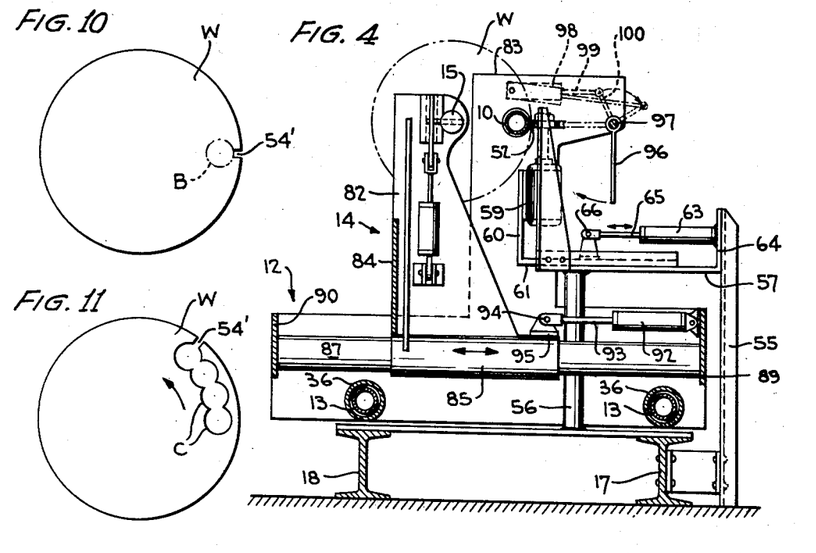
FIGURE 4 is a cross setion on the line 4—4 of FIGURE 2.
FIGURE 10 is a diagrammatic endwise view of a log showing the manner in which the slotting saw provides a radial slot adapted for intersection with the initial cut of the tube saw, and in advance of the forward operative end of the tube saw in order to permit escape of the sawdust from within the cut.
FIGURE 11 is a further diagrammatic view of the same log shown in FIGURE 10, after the latter has been repeatedly indexed through successive angular positions in which the cuts have been made to intersect each other in a manner to permit escape of the sawdust from each cut into the immediately preceding cut.

For supporting and feeding the work there is provided a feed carriage 12 which is guided along rails 13 on the frame for movement parallel to the rotational axis of the saw tube, together with a work holder 14 supported on this carriage for rectilinear movement transversely to the tube axis. Work supporting centers 15 and 16 on the work holder 14 function to rotatably support the logs or other workpieces W for rotary indexing movement about an axis parallel to but substantially displaced from the axis of the saw tube, whereby indexing movement of the workpiece about its indexing axis and appropriate feeding of the workpiece onto and from the saw tube will result in the formation of a cylindrical series of cuts or bores C through the workpiece W concentrically to its indexing axis, as indicated in FIGURE 11.

These cuts or bores, all being formed by the same saw tube 10, will be of identical diameter. In order to provide the maximum number of cuts of the saw tube within a given circle or series of cuts, it is desirable to angularly index the workpiece between cuts only to the extent necessary to prevent overlapping of the cylindrical rounds or billets, with resulting deformation. Accordingly an indexing mechanism is provided for automatically varying the angular indexing increments of a given workpiece W in accordance with the distance between the indexing axis of the log and the rotational axis of the tube saw.

*Main Frame*

Figures 1, 5:
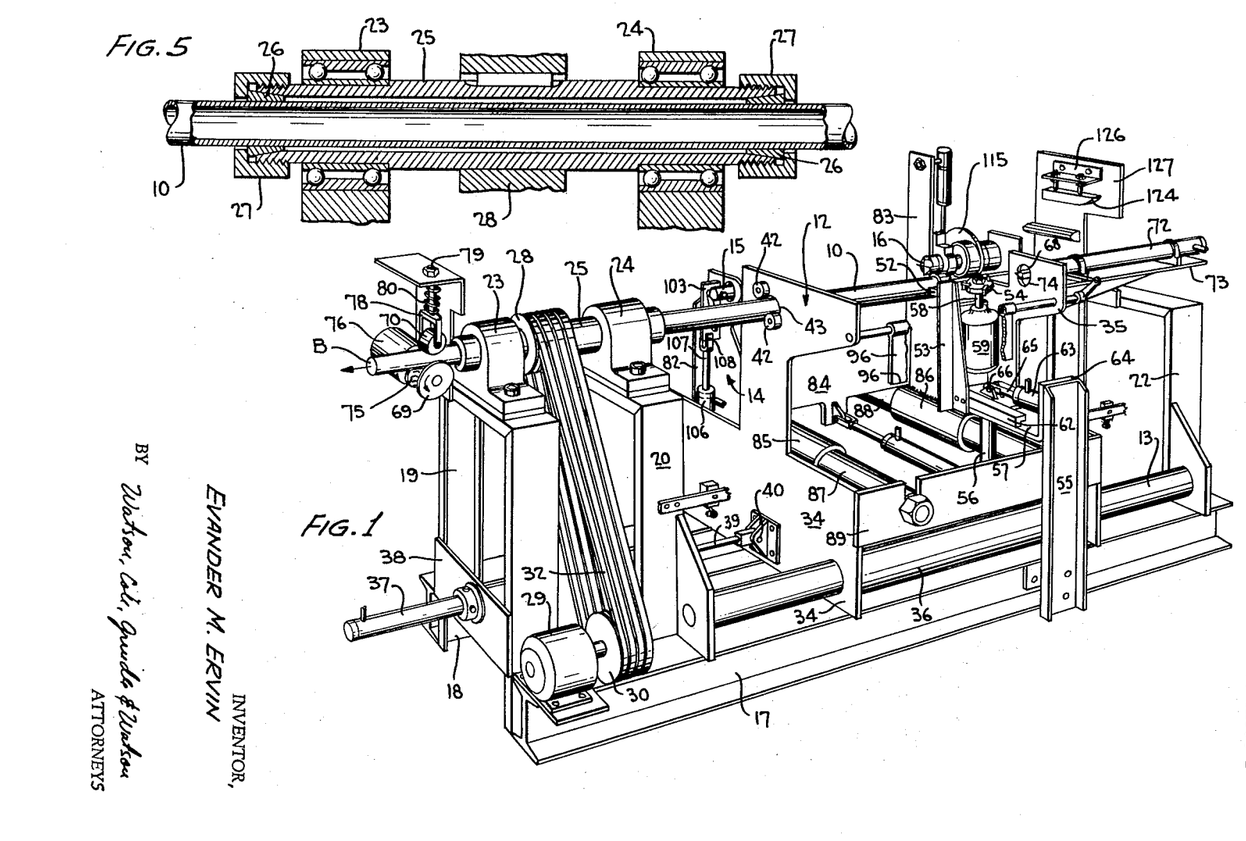
FIGURE 1 is a perspective view of a tubular sawing machine incorporating the improvements of the present invention.
FIGURE 5 is an enlarged axial section through the saw tube and its associated supporting chuck, bearings and drive pulley.

Now considering the invention in more detail, it will be seen that the main frame comprises a pair of parallel horizontal supporting base members 17 and 18 which are exemplified by the heavy I-beams shown in FIGURE 1. Projecting upwardly from and interconnecting them are the cross frame structures 19, 20 and 22, of which the structures 19 and 20 comprise relatively longitudinally spaced upright bearing supports at the rear end of the frame on which are fixedly mounted the relatively spaced bearings 23 and 24 for the tube saw.

*The Saw Tube*

The tube saw 10 is rotatably supported by way of these bearings and at the same time held against longitudinal displacement, preferably by the chuck structure such as shown in FIGURE 5, in which the saw tube extends through a hollow chuck sleeve 25 having outwardly flaring ends for the reception of wedge members 26 which are urged inwardly toward each other and thus radially inwardly into holding engagement with the saw tube 10, by means of the annular collars 27 threaded onto the ends of the sleeve. These collars abut against the outer ends of the wedges 26 to urge them inwardly. In other words the combined structure 25, 26, 27 is the equivalent of a chuck which, by means of the wedges 26 is made fast to the saw tube 10 and yet permits ready release and replacement of the tube.

It will be seen that the bearings 23, 24 which support the chuck structure are of the type which function as thrust bearings to prevent axial movement of the chuck and saw tube 10.

Figure 2:
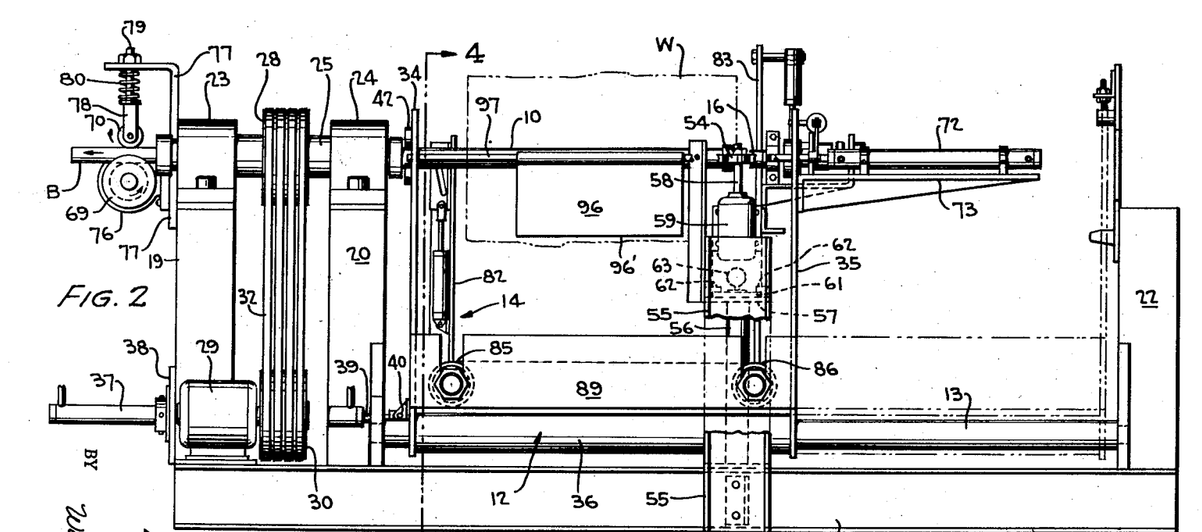
FIGURE 2 is a front elevation of the structure shown in FIGURE 1, with the feed carriage in the position which it assumes at the end of its operative feed stroke, and showing in broken lines a workpiece in the form of a log positioned therein.
Figures 3, 9, 15, 16:
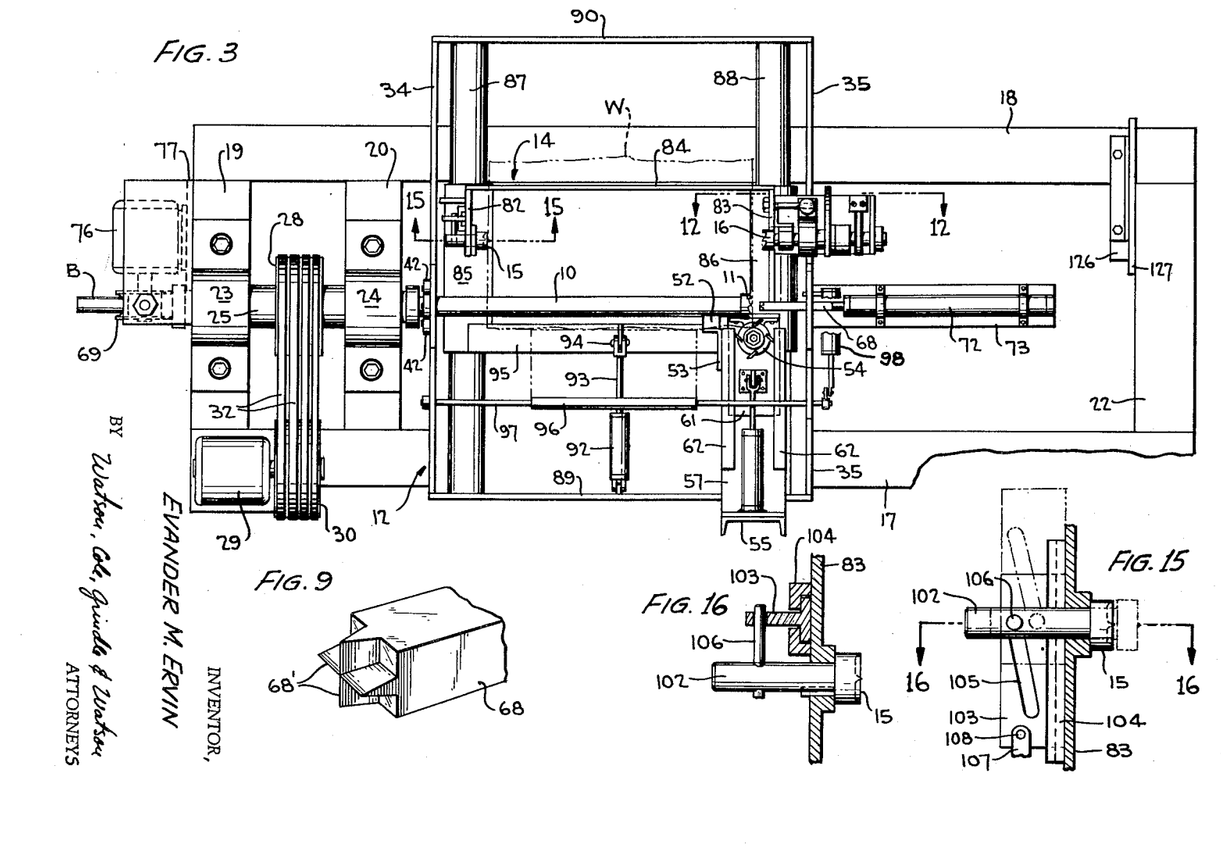
FIGURE 3 is a plan view of the structure shown in FIGURE 2.
FIGURE 9 is an enlarged perspective view of the forward or operating end of the workpiece ejector.
FIGURE 15 is an enlarged sectional view on the line 15—15 of FIGURE 3, looking in the direction of the arrows.
FIGURE 16 is a section on the line 16—16 of FIGURE 15.

For driving the saw tube 10 the chuck 25 has externally keyed thereon a driven sheave 28 of the multi V-grooved type, to which rotation is imparted from the electric motor 29 and its multi V-grooved sheave 30, through the multiple V belts 32 as shown in FIGURES 1, 2 and 3 of the drawings.

In order that the saw tube 10 may have both external clearance within the bore which it cuts in the workpiece, as well as internal clearance with the cylindrical round or billet B which it cuts from the workpiece and which is received within it, it is desirable that the toothed free end of the saw be formed as a collar 33 having the teeth 11 extending radially across its leading annular edge, the collar and teeth being of lesser internal diameter than the remainder of the saw tube and of somewhat greater external diameter than the rest of the saw tube.

Figure 6A:
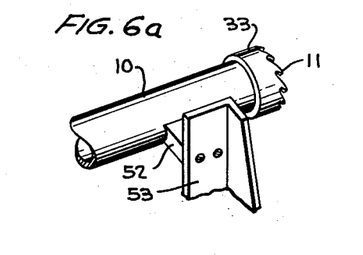
FIGURE 6A is a fragmentary perspective view of the forward operative end of the saw tube and a magnetic bearing or guide block which may be associated with the saw tube for resisting deflection of its free forward end.
Figure 6B:
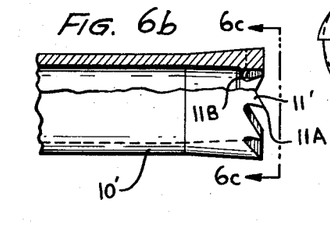
FIGURE 6B is a somewhat enlarged elevational view partly in axial section of the toothed operative end of a modified form of tube saw in accordance with the invention.
Figures 6C, 6D:
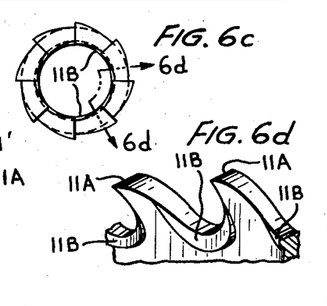
FIGURE 6C is an end elevation of the structure shown in FIGURE 6B as seen from the right-hand or toothed end looking in the direction of the arrows 6C—6C in FIGURE 6B.
FIGURE 6D is an enlarged fragmentary elevation of the sawtoothed structure taken on the line 6D—6D of FIGURE 6C.

In FIGURES 6B, 6C and 6D there is illustrated an improved form of the tubular saw in which the teeth are given a special formation adapted to minimize the entry of sawdust into the tube while at the same time reinforcing the several saw teeth. In this arrangement the free end of the saw tube 10' terminates in an annular series of teeth 11' which are of tapered construction having their maximum width or thickness along their cutting edges 11A, the arrangement being such that the external diameter of these teeth at their cutting edges is greater than the external diameter of the tube 10' and similarly the internal diameter of the path generated by the inner edges of the teeth 11A is of smaller diameter than the interior of the tube 10'. In this manner clearance for the saw tube is provided both externally and internally. Because of this clearance, which is provided internally of the saw tube between the tube and the billets being formed therein, there would normally be the possibility of sawdust accumulating in the clearance space between the saw tube and the billet to such an extent as to bind the saw and to unduly heat and/or burn the billet. Accordingly the entry of sawdust within the saw tube is minimized in this embodiment of the invention by the formation of integral inwardly projecting bosses 11B formed at the bases of the notches between adjoining teeth and extending upwardly along the edges of the said teeth in substantially a U-shape as shown in FIGURE 6D. These inward projections or bosses 11B are curved to lie on a common circle coaxial with and substantially of equal diameter to the common path of rotation defined by the inner ends of the edges 11A of the respective teeth. Thus the bosses 11B will jointly define a collar of substantially the same internal diameter as the path defined by the inner edges of the teeth 11A themselves, whereby to closely approach or engage the billet cut by the teeth, though but for a limited axial extent. In this manner the barriers or bosses 11B jointly provide a circular barrier to obstruct the axial movement of sawdust into the interior of the tube 10'.

While the said bosses 11B, insofar as their sawdust blocking action is concerned, are the equivalent of a continuous ring of similar internal diameter fixed in the tube adjacent the bases of the teeth 11', and such a ring structure is regarded as within the scope of the present invention, the formation of such a ring in the form of the individual bosses or segments 11B is preferred as affording the added advantage of reinforcing and strengthening the teeth 11'. The ribs or segments 11B may be formed by welding material deposited in a manner well-known in welding operations and subsequently ground to the desired internal curvature and diameter.

*The Feed Carriage*

The feed carriage 12 which supports the workpieces W for feeding movement relative to the saw tube 10 is exemplified by the longitudinally opposed rigid end plates 34 and 35 rigidly interconnected at their bases by transversely spaced but relatively parallel sleeves or sleeve bearings 36 by means of which the carriage is guided on the horizontal rails 13 of the main frame for longitudinal feeding movement parallel to the rotational axis of the tube saw 10. Such movement, either to feed the saw through its operative stroke toward the left in FIGURE 1, or to retract it, may be imparted by means of a double acting pneumatic cylinder and piston structure, the cylinder 37 of which is fixedly supported from the frame cross member 38 (FIGURE 1) and which has its piston operatively connected by means of the rigid link 39 to a bracket 40 fixed on the carriage end plate 34.

*Free End Saw Bearing Means*

In order to support the free end of the saw tube 10, it is desirable to provide the carriage end plate 34 with suitable bearing means 42 in both sliding and rotary engagment with the saw tube. In the form of the invention shown in FIGURES 1, 2 and 3 the carriage end plate 34 is formed with an opening 43 which loosely receives the saw tube. These bearing means 42 are shown as comprising rollers which are arranged around opening 43 and may advantageously be constructed of nylon or other suitable material. Their arrangement is such as to fixedly center the free end of the saw tube at the beginning of the cut, though the rollers are free to slide axially along the tube as the cut progresses.

Figure 7:
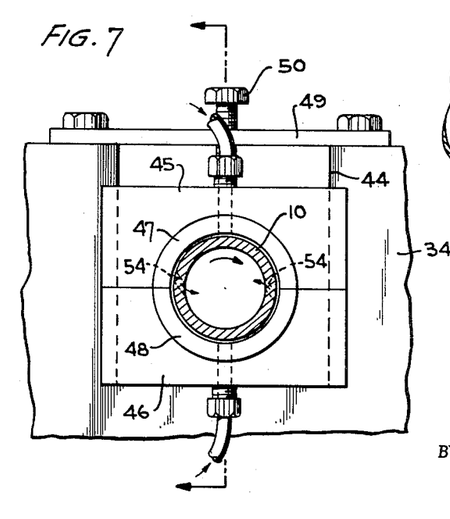
FIGURE 7 is an enlarged cross section through a modified form of bearing structure in which cooling fluid is injected both between the bearing surfaces and also between the workpiece and the inner periphery of the tubular saw.
Figure 8:
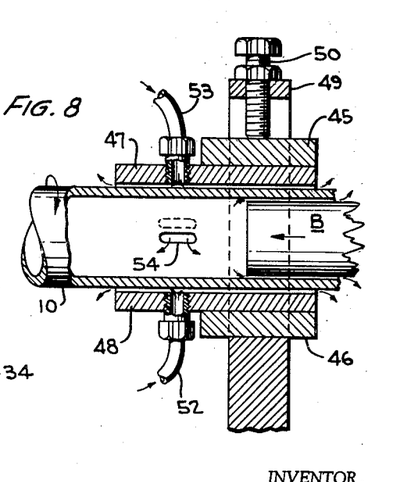
FIGURE 8 is a section in an axial plane through the saw tube and its associated structure as shown in FIGURE 7.

In a specialized and improved modification of this bearing, such as illustrated in FIGURES 7 and 8, provision is made for supplying a cooling and lubricating fluid such as water both between the saw tube and bearing and in addition between the saw tube and the wooden round B which is formed and remains stationary within the tube throughout most of the cut, until such time as the wooden round is completely severed from the rest of the log.

Thus referring to FIGURES 7 and 8, the rearmost carriage end plate 34 of FIGURES 1, 2 and 3 is formed with a downwardly opening recess 44 having opposed vertical side edges and a horizontal bottom edge. The bearing structure which is received in this recess comprises a pair of relatively opposed members 45, 46, having complementary semicylindrical bearing portions 47, 48 adapted to receive and journal the saw tube 10 with substantial clearance. Fluid injection fittings 52, 53 extending through the walls of the respective bearing halves and threaded or otherwise secured therein are supplied with water through the conduits illustrated, the water being supplied from any suitable source. Alternately, in lieu of water, it is contemplated that other lubricating and cooling liquids or fluids may be employed. The fluid thus flowing between the opposed surfaces of the bearing structure and saw tube is free to escape axially to be replaced by further fluid for improved cooling purposes. Preferably a portion of this fluid is diverted into the interior of the saw tube 10 through one or more openings 54 in its sidewall to thus act as a lubricant and cooling agent between the inner periphery of the tube and the relatively stationary round or billet which is formed within it.

It will be seen that the bearing members 45 and 46 have grooved ends receiving the carriage end plate on opposite sides of the opening 44 therein. Normally the upper end of the opening 44 is closed by a rigid bridging piece 49 through which is threaded a set screw 50 for the purpose of securing the two bearing members within the opening and in complementary relation with respect to each other.

*Magnetic Bearing*

The bearing means just described for the free end of the saw tube will, of course, move toward its rear end during the progress of each cut into the workpiece. The workpiece W itself will normally provide a certain amount of support and steadying for the saw tube, once the saw tube has substantially penetrated the workpiece. However, where the saw tube is used on workpieces in which the wood is particularly dense or in which the grain is unusually crooked, it may be desirable to provide a suitable bearing which is fixedly supported from the main frame to thus remain in fixed position adjacent the free end of the saw for minimizing displacement and chattering thereof.

Thus referring to FIGURES 1 and 6 such a bearing, preferably in the form of a strong magnet 52 for rotary engagement with the saw tube adjacent its free end, is supported from an upright portion 53 of the main frame. This bearing is in engagement with the saw tube 10 at one lateral side thereof to positively resist lateral displacement of the tube in one direction by abutment with the tube, and to resist displacement of the tube in the other lateral direction by its magnetic attraction on the tube which will normally be formed of a ferromagnetic material. Obviously the magnetic bearing may be of the electro magnetic type in order to produce a strong magnetic field for its intended purpose.

*Slotting Saw*

In order that the bearing 52 may not interfere with the feeding movement of the workpiece onto the tube saw, there is disposed in advance of the bearing the slotting saw 54 which is positioned to form a slot 54' (FIGURES 10 and 11) radially intersecting the bore C which is formed in the workpiece by the tube saw. The slotting saw 54 is positioned just in advance of the free end of the tube saw 10 and bearing 52 and is arranged to form the slot 54' in position for reception of the bearing 52.

As is illustrated in FIGURE 4, both the magnetic bearing 52 and the slotting saw 54 and its associated mechanism are supported from the side of the main frame by means of an outboard vertical frame member 55 in the form of a channel iron which together with frame member 56 fixedly supports the horizontal shelf 57 fashion. The vertical frame member 53 which carries the bearing 52 at its upper end is fixedly secured at its lower end to the free end of the said shelf. The slotting saw 54 is fixedly secured on and driven by the shaft 58 of an electric drive motor 59 which in turn is supported by an upright member 60 from a slide which is guided for movement transversely over the shelf 57 between the relatively parallel overhanging guide rails 62 thereon. The slide 61 is urged into and from operative position by means of a double acting pneumatic piston and cylinder unit in which the cylinder 63 is affixed to the upturned shelf portion 64, and the piston rod 65 has its outer free end connected to the slide by the clevis structure 66.

With this arrangement, as long as the magnetic bearing 52 is employed it will be necessary that the slotting saw 54 be operatively positioned to provide a slot in the workpiece so that the workpiece may move freely past the magnetic bearing on each cut. However, where the magnetic bearing 52 is not needed and thus is removed, it will be necessary to operatively position the slotting saw 54 only during the formation of the initial cut in each log, this being desirable simply so that the slot thus formed may provide an outlet for the sawdust which is produced. On subsequent cuts the sawdust formed during the course of each cut will be displaced into an immediately adjoining cut by virtue of the intersecting relationship of the cuts or bores C formed in the workpiece. The arrangement of a slotting saw for the foregoing purposes is disclosed and claimed in copending application Serial No. 152,896, filed November 16, 1961.

*Work Ejector Mechanism*

For ejecting each completed round or billet B rearwardly through the tubular saw 10 there are preferably provided coacting mechanisms including the pneumatically actuated plunger 68 which is adapted to be projected into the open forward end of the saw tube 10 to abut against and urge each completed round B at least partially therethrough. For receiving the rear end of and completely extracting from the tube each thus partially ejected round B there are provided cooperating friction rollers 69 and 70.

It will be seen that the ejector plunger 68 constitutes the piston rod of a pneumatic piston and cylinder unit of the double acting type in which the cylinder 72 is fixedly secured to shelf-like bracket 73 affixed to the upright supporting front end plate 35 of the main frame. The ejector plunger 68 extends through a registering opening 74 in the adjacent carriage end plate 35 into operative engagement with the workpiece. Preferably at the inception of each cut the air pressure to the cylinder 72 is actuated to thrust the ejector plunger against the adjacent end of the log W in alignment with the saw tube so that immediately as soon as the cut is completed the air pressure within the cylinder will project the ejector plunger into the saw tube and at least partially eject the completed round to the extent that its rear end will be received between the extractor rolls 69 and 70.

As is best illustrated in FIGURE 9, it is desirable to form the leading or work engaging end of the ejector plunger 68 with one or more cutting edges or projections 68' located eccentrically to the cylindrical axis of the saw tube and thus to the wooden round formed by it. The function of these is to bite into the adjacent end of the completed wooden round B to prevent it from rotating with the saw tube 10 during the period of its ejection from the saw tube and after it has been freed from the workpiece.

The extractor rolls 69 and 70 illustrated in FIGURES 1, 2 and 3 will be seen to comprise the driven roller 69 having a generally semi-circular cross-sectional groove in its periphery for the reception of the completed rounds. Preferably this groove is formed with raised ribs or teeth 75 (FIGURE 1) to provide traction for improved frictional engagement with the completed rounds. This roll 69 is preferably mounted on the drive shaft of an electric motor 76 which in turn is fixed to a bracket 77 secured on the main frame upright. The upper roller or idler is rotatably supported from an inverted U-shaped yoke or fork 78 having a vertical supporting stem 79 which is slidably keyed through an overhanging portion of the bracket 77 and is urged downwardly by means of the compression spring 80. It will be seen thus that the rounds, after being received between the rolls, will be positively gripped by them and completely extracted from the tube saw to be thrown rearwardly into a suitable bin or other receptacle (not shown).

*Modified Work Ejector Mechanism*

Figures 20, 21:
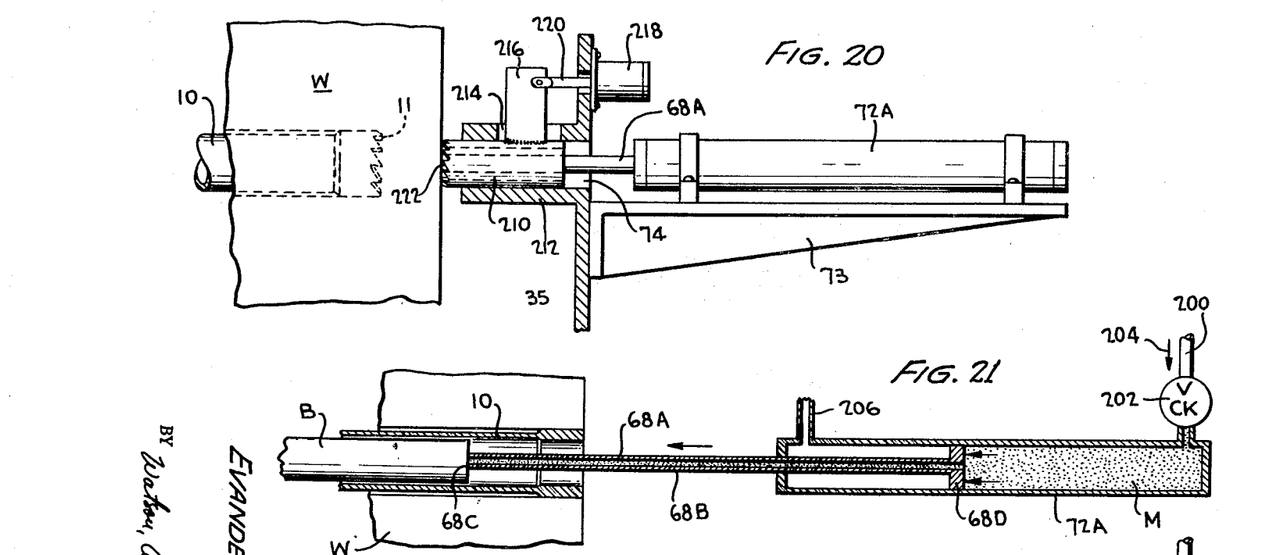
FIGURE 20 is a view partly in elevation and partly in section showing a modified arrangement of the billet ejecting plunger in operative engagement with a log or workpiece, the tube saw being shown fragmentarily as it appears when near the end of the cut.
FIGURE 21 is a diagrammatic view in axial section through the modified ejection plunger and associated structure of FIGURE 20 showing the plunger positioned midway of its ejection stroke.
Figure 22:
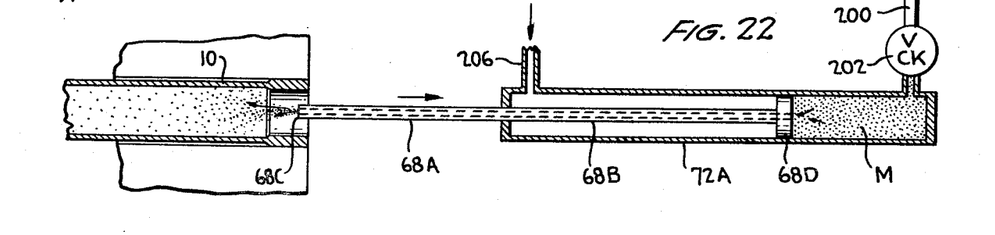
FIGURE 22 is a view similar to FIGURE 21 but showing the plunger as it appears when approaching the end of its return stroke.

In FIGURES 20, 21 and 22 there is shown a modified form of work ejector mechanism incorporating certain improvements over the structure above described. As in the earlier described ejector mechanism, the modified ejector mechanism consists of a double acting pneumatic cylinder and piston structure in which the cylinder 72A is affixed to the supporting bracket 73 on the carriage end plate 35. This differs from the earlier described mechanism, however, in that the ejection plunger 68A is of tubular construction having a restricted passage 68B extending completely therethrough and opening both through its work engaging end 68C as well as through its associated piston portion 68D shown best in FIGURES 21 and 22. For admitting pressurized air to the cylinder 72A for projecting the plunger 68A on its operative ejecting stroke, compressed air is delivered into the cylinder through suitable control valves (not shown) and through the supply line 200 having a check valve 202 disposed therein. Valve 202 permits the passage of the pressurized air into the cylinder only in the direction indicated by the arrow 204 in FIGURE 21 and prevents its escape therefrom.

Communicating with the interior of the cylinder 72A at the opposite end thereof from the line or conduit 200 is a further air supply line or conduit 206 through which compressed air may be supplied under the control of conventional valve means such as above mentioned for, retracting the plunger 68A toward the right in the direction indicated in FIGURE 22 following completion of its ejection stroke. The air pressure through line 206 merely serves the same purpose as a conventional return spring in rendering the cylinder and piston unit double acting.

For augmenting the thrusting action of the plunger 68A at the inception of the ejection stroke, as well as for preventing rotary movement of the completed round or billet with the tubular saw tube at this time, it has been found desirable to provide an auxiliary thrust member 210 in the form of a hollow sleeve bearing or member coaxial with and slidably receiving the plunger 68A. This auxiliary plunger 210 in turn is guided for limited reciprocation movement in a cylindrical housing 212 affixed to the plate 35. Housing 212 is provided with an axially extending opening or slot 214 through which extends an actuating arm 216 rigidly affixed to the auxiliary plunger 210. Axial movement in either direction is imparted to the auxiliary plunger 210 by means such as a double acting pneumatic cylinder and piston unit in which the cylinder 218 in FIGURE 20 is affixed to the end plate 35 of the carriage with the piston rod 220 extending through an opening in the plate and serving to connect the arm 216 to a conventional piston (not shown) housed within the cylinder 218. At its free or work engaging end, the auxiliary plunger 210 is formed with a series of work engaging teeth 222 presented in an opposite circumferential direction from the teeth 11 of the tubular saw to thus resist the rotary forces imparted to the billet or round by rotation of the saw.

In the operation of this improved work ejector mechanism, as the workpiece W is fed onto the tubular saw, air pressure is supplied to both cylinders 72A and 218 to urge the plunger 68A and auxiliary plunger 210 simultaneously against the adjoining axial end of the workpiece W. As the saw teeth 11 near the end of the cut, the billet or round is thus freed from the workpiece W and both of the plungers 210 and 72A, which up to this time have been held against movement by their abutting engagement with the log W, will assist the saw teeth in freeing the billet and urging it through the tube saw 10. It will be noted that both the plunger 68A and the auxiliary plunger 210 are axially aligned with the tube saw 10 and that the exterior diameter of the auxiliary plunger 210 is somewhat less than the interior diameter of the tube saw, whereby the auxiliary plunger as well as the plunger 68A may freely enter the adjoining toothed end of the saw 10 without interference with the saw teeth.

By virtue of its limited stroke, the auxiliary plunger 210 will augment the action of the main ejector 68A only at the inception of the stroke of the latter, at which time the greatest force is required to free the billet from the rest of the workpiece W and to commence its axial movement through the saw 10. At the same time, the teeth 222 of the auxiliary saw will prevent the billet from breaking loose prematurely from the log, due to the torque exerted by the saw tube 10.

As will be seen by reference to FIGURES 21 and 22, as long as the free work engaging end of the tubular ejector plunger 68A engages the end of the billet B and that portion of the log which is to form the billet B, its air passage 68B will be obstructed, whereby the compressed air acting on the piston 68D cannot readily escape. Due to the comparatively small or restricted size of the passage 68B as compared with the interior of supply line 200 and the overall diameter of the piston 68D, the air pressure may act readily to move the entire plunger 68A to bring its free end into operative abutting engagement with the log or workpiece W.

It is highly desirable in accordance with the invention to inject an oil spray into the compressed air which is supplied to the right-hand end of the cylinder 72 through the inlet conduit 200, whereby such oil spray will be carried into the interior of the tubular saw together with the air jet issuing from the plunger 68B at the end of the ejection stroke and throughout the retraction of the ejector plunger 68.

Thus in the overall operation of this particular ejector plunger arrangement, in order to commence the ejection stroke, both the main plunger 68A and the auxiliary plunger or sleeve 210 press against the end of the log W throughout the cut so that at the end of the cut they immediately act to force the severed round through the tube saw 10 from right to left as seen in FIGURE 20. As the completed round or billet emerges from the rear end of this saw it may be gripped between rollers 69 and 70 such as described in connection with the earlier mentioned form of work ejector mechanism. During the ejection stroke, the escape of the actuating air and oil spray mixture through the passage 68B is prevented by the abutting engagement of the free end 68C of the plunger 68A with the billet B. However, as soon as the billet B is free of the end of the plunger, the mixture of air and lubricant is free to escape into the interior of the tubular saw.

In order to retract the plunger 68A the flow of pressurized air through its conduit 200 is then discontinued in known manner and a supply of compressed air is then introduced into the opposite end of the cylinder 72 through its inlet conduit 206. During the retraction stroke the actuating air and lubricant mixture M in FIGURES 21 and 22 is retained within the cylinder by the action of the check valve 202 and thus is expelled through the passage 68B by the retraction stroke of the plunger to lubricate the interior of the saw 10.

Work Support

The logs or workpieces W are supported on the feed carriage for rotary indexing movement about their respective major longitudinal axes. Such axis of each operatively positioned workpiece will normally extend parallel to and be displaced laterally to one side of the saw tube 10 in such manner that repeated cuts of the tube will be disposed in one or more rings concentric to the major longitudinal or indexing axis of the log. Obviously it is desirable to form the outermost ring of cuts as close together and also as closely as possible to the outer periphery of the log or workpiece in order to achieve the maximum number of cuts. Since the different logs may normally vary quite considerably in their respective diameters, it is obviously necessary in order to do this, that means be provided for adjusting the indexing axis of each log laterally toward or away from the axis of the tubular saw in order to position the initial or outermost ring of cuts in different logs at the maximum radial distance from the axes of logs of varying diameters.

Accordingly there is provided on the carriage the transversely adjustable work support 14 in the form of the cross slide having the work supports or centers 15, 16 for supporting engagement with the opposite ends of workpieces. These relatively spaced centers or supports 15 and 16 are relatively aligned in a direction parallel to the rotary axis of the tube saw and define the indexing axis for the workpiece.

The work support 14 is shown in the drawings as comprising a pair of relatively longitudinally spaced end plates 82 and 83 interconnected rigidly by a longitudinal plate 84. Rigidly affixed to the respective end plates are bearing sleeves 85 and 86 which are slidably disposed on guide rails 87 and 88 constituting parts of the carriage. These rails extend horizontally and parallel to each other transversely to the longitudinal movement of the carriage and are fixedly supported between the carriage side plates 89 and 90 which will be understood to constitute rigid portions of the feed carriage 12.

For transversely moving the work support 14 to desired positions of adjustment along the supporting rails there is provided power means exemplified in FIGURES 3 and 4 by pneumatic cylinder and piston unit 92, 93 of which the cylinder 92 is attached to one of the carriage side plates 89, while the outer end of the piston rod 93 is connected at 94 to the work carrier 14, either through its longitudinal frame members 95 as in FIGURES 3 and 4, or through its longitudinal plate 84, as in FIGURE 1.

Transverse Work Positioner

As is best shown in FIGURES 1, 3 and 4, it is desirable to provide a retractable work positioning means or abutment which in the present instance is in the form of a plate 96 swingably supported on a rod 97 extending between and carried by the feed carriage end plates 34, 35. The arrangement is such that the abutment member or plate 96 may be swung from its normal retracted or downwardly swung position (shown in full lines in the figures) to an operative horizontal position, indicated in broken lines in FIGURES 3 and 4. In this position the free edge of the plate 97 is presented for abutting engagement with the outer periphery of the log W to thus limit the transverse movement of the log W and its support 14 toward the axis of the saw and bring them to rest in a position in which the tube saw 10 will be radially positioned as closely as practical to the outer periphery of the log in order to make a ring of cuts closely adjacent its outer periphery.

It will be observed that the rod 97 which defines the axis of movement of the stop plate 96 lies in the same horizontal plane as the axis of the saw tube as well as the indexing axis of the log, while the rectilinear free edge 96' of the stop plate is parallel to its axis of swinging movement and thus when operatively positioned will also be parallel to the rotational axis of the tubular saw.

For swinging the stop plate to and from its operative position there is provided a power means in the form of a pneumatic cylinder 98 (FIGURE 4) pivotally mounted on the end plate 35 of the carriage frame and having its piston rod 99 pivotally connected to the free end of a crank arm 100 extending radially from and affixed to the support rod for the stop plate. The support rod itself in this instance is rotatably journaled through the carriage end plates 34 and 35 and the stop member or plate 96 is fixedly secured on the rod 97 for rotary movement with it. The pneumatic piston and cylinder unit in this instance is of conventional double acting type adapted to be controlled by known valve means and in usual manner.

Work Centers

The work centers which define the indexing axis of the workpieces are exemplified by the nonrotatable but retractable tail stock 15 at the rearward end of the work support and the rotatably journaled head stock 16 at the forward end of the work support. As is shown in detail in FIGURES 15 and 16, the tail stock 15 is supported by a shaft 102 which is slidably keyed through its supporting end plate 83 of the work support, whereby it may be projected into or withdrawn from operative engagement with the workpiece. In FIGURES 15 and 16 it is shown in full lines in its retracted or withdrawn position and in FIGURE 15 it is shown in broken lines in its projected or operative position. The operative or work engaging end of this tail stock 15 is arranged to permit rotation of the workpiece about a fixed axis which is defined by the projecting point surrounded by the concentric angular edge. Both of these are adapted to bite into the workpiece incident to projection of the tail stock.

Projection and retraction of the tail stock or work center 15 is produced in response to movement of a sliding cam 103 guided for movement in trackways 104 on the forward face of the end plate or frame member 83 of the work support. As is shown in FIGURES 15 and 16, the slide 103 is formed with a cam slot 105 which slopes relatively to its rectilinear path of movement and which receives a follower 106 in the form of a stud affixed to and projecting from the shaft 102 of work center 15. The slide 103 may be moved either manually or by means of a pneumatic piston and cylinder unit 106. the piston rod 107 of which is connected at 108 to the slide as shown, the cylinder itself being mounted on the end plate 35 of the work support.

The other work support center or head stock 16 is preferably rotatably supported at the forward end of the work support 14 and adapted for rotary driving engagement with the workpiece so that, in addition to functioning as a supporting and centering means for the workpiece, it may also constitute an element of the indexing mechanism. To this end the work center or head stock 16 includes and is rotatably supported by means of an indexing shaft 109 rotatably supported in bearings 110 and 112 supported from a bracket 113 affixed to the forward end plate 83 of the work support. Shaft 109 extends through an opening in plate 83 and the head stock 16 is formed with teeth 114 (as in FIGURE 20) having generally radially extending edges adapted to bite into the work in rotary driving engagement therewith so that rotary indexing movement of this particular center may be imparted also to the workpiece.

Indexing Mechanism

Figures 12, 13, 14:
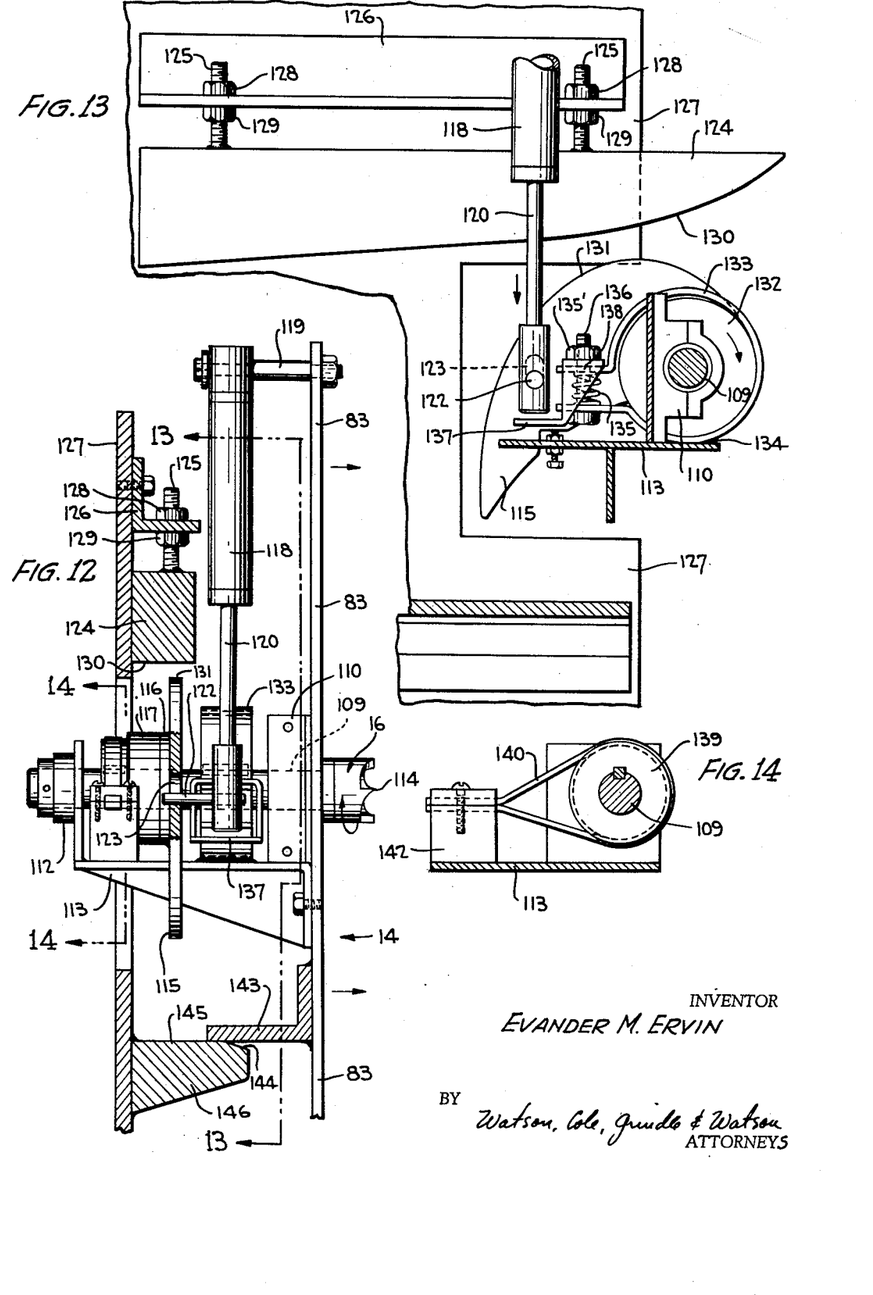
FIGURE 12 is an enlarged detail view on the line 12—12 of FIGURE 3, showing the indexing mechanism with the several parts thereof in their relative operative positions in the fully retracted feed carriage.
FIGURE 13 is a sectional view on the line 13—13 of FIGURE 12.
FIGURE 14 is a detailed sectional view on the line 14—14 of FIGURE 12.

The indexing mechanism is shown most clearly in FIGURES 12, 13 and 14 of the drawings.

For causing angular indexing movement of the shaft 109 and indexing center 16 in proper increments and in the desired direction of rotation, there is provided the lever 115 which is journaled for swinging movement about the shaft. Coupled to this lever for swinging movement therewith is the driving member 116 of a conventional one-way coupling or clutch, the driven member 117 of which is suitably affixed to the shaft to transmit unidirectional rotary or angular movement to the shaft and work center.

The lever 115 may be driven manually if desired, though it is preferred to provide a power drive for it as exemplified by the pneumatic double acting cylinder and piston unit shown in FIGURES 12 and 13. The cylinder 118 of this unit will be seen to be pivotally mounted at 119 on the work support end plate 83 while the projecting external end of the piston rod 120 is operatively connected to the free end portion of the lever by means of a pin 122 carried by and projecting transversely from the piston rod 120 and extending through an opening 123 in the lever. This opening 123 in the illustrated form of the invention, is in the form of a slot which coacts with the transverse pin to form a lost motion connection permitting a certain predetermined extent of loss motion between the piston rod 120 and the lever 115 for a purpose which will be explained hereinafter.

When viewed from the direction of FIGURE 13, the indexing movements or increments of the indexing shaft 109 and its driving center 16 occur in a clockwise direction, or in other words on the upward operative stroke of the piston rod 120. Thus the one-way clutch or coupling is of the type which engages in this particular direction and is disengaged on the return stroke of the lever and piston rod.

The angular extent of each increment of indexing movement of the shaft 109 and lever 115 is determined by engagement of the lever 115 with a stop member 124 fixedly carried on the main frame in such position as to be disposed in the path of upward swinging movement of the lever in the fully retracted forward position of the feed carriage 16. This relationship is shown in FIGURE 12, in which it will be seen that the stop member 124 is fixedly supported by bolts 125 from an angle bracket 126 bolted or otherwise secured on the rearwardly presented face of a rigid plate 127 carried by the upright forward end portion 22 of the main frame. The bolts 125 preferably are slidably disposed through openings in the angle bracket and a pair of nuts 128, 129 threaded on each bolt respectively above and below the bracket provide means for adjusting the height of the stop as desired.

It is an important feature of the present invention that either the stop member 124, the lever 115, or both, as in the present embodiment, be provided with cam surfaces extending generally in the transverse direction of adjustment of the work support but having sloping portions arranged to vary the angular extent of the indexing increment inversely with respect to variations in the distance of the indexing center or axis from the rotational axis of the saw tube in order to maintain substantially constant spacing between the centers of successive cuts. In other words, the arrangement is such that as the distance between these axes is increased by transverse movement of the work holder in order to accommodate a workpiece of comparatively large diameter, the cam surface or surfaces will accordingly decrease the range of swinging movement of the lever to compensate for the comparatively large circumference of the log. On the other hand where the log is of small diameter and its indexing axis is accordingly disposed relatively closer to the saw tube 15, the indexing increment will be increased accordingly to maintain the desired spacing between the centers of adjoining cuts.

In order to form the maximum number of cuts in a circle of any given radius within the range of adjustment of the various parts, the cam surface or surfaces will be preferably arranged so that at any given radius of a circle of cuts C (FIGURE 11), the annular kerfs defined by the annular saw teeth will intersect each other. By virtue of such intersection, each cut or bore after the initial one communicates with a preceding bore through the slot formed by such intersection so that sawdust formed during each cut after the first may readily escape into the immediately preceding cut.

Although cooperating cam surfaces 130 and 131 are shown on both the fixed stop 124 and on the lever 115 in the present embodiment it will be readily apparent that but one such cam surface of proper configuration on either element may suffice.

As above mentioned, the indexing movement of the lever 115 is transmitted to the indexing center 16 and workpiece W on the upper stroke of the lever, while on the downward or return stroke of the lever the one-way clutch 116, 117 is disengaged. However, the return stroke is employed for actuating a brake means to fixedly secure the indexing shaft 109 in its freshly indexed position between indexing increments. The braking means or mechanism as shown in FIGURES 12 and 13 comprises a brake drum 132 which is fixedly keyed on the indexing shaft 109 for cooperation with a surrounding brake band 133 of stiffly flexible metal. Adjacent one end, brake band 133 is fixedly secured, as by welding 134 to the supporting bracket 113. The projecting free ends of the brake band normally are resiliently urged apart toward release position by a spring 135 compressed between them. A bolt 136 extending through these ends and through the spring 135 serves not only to maintain the position of the spring, but coacts with its nut 135' (see FIGURE 13) to limit the extent of opening movement of the brake band.

In addition, this bolt 136 provides a securing means for a brake operating pedal 137 which extends beneath and in alignment with the lower end of the piston rod for engagement and actuation thereby to apply the brake. It will be seen that this pedal includes a supporting saddle or yoke portion 138 in the form of an inverted U which is slidable on the bolt 136 and extends across the movable free end of the brake band.

In FIGURES 13 and 14 the lever 115 and piston rod 120 are shown as they move through their return stroke. As they approach the end of this stroke the end of the piston rod will engage the pedal 137 to apply the brake. The piston will be brought to rest with the brake applied and will be caused to remain in this position throughout the next carriage feeding movement and retraction movement, following which another indexing operation will ensue. By virtue of the lost motion connection exemplified by the slot 123 and pin 122 it will be seen that the initial part of the operative stroke of the piston will not be transmitted to the lever, but will serve only to release the brake. The extent of lost motion will be sufficient to fully release the brake and thereby permit free indexing movement of the lever and shaft, before such movement is actually transmitted to these parts.

In order that friction between the lever 115 and shaft 109 and between the driving and driven parts 116 and 117 of the one-way clutch may not cause undesired angular movement of the indexing shaft 109 during the return or idle stroke of the lever, there is provided a suitable yieldable frictional holding means for shaft 109 having sufficient holding power to resist such inadvertent displacement forces but offering no appreciable impedance to the indexing movement. Such a means is illustrated in detail in FIGURE 14, being exemplified by a V-grooved sheave 139 fixedly keyed on the indexing shaft and having operatively disposed therearound a length of V-belting 140, the ends of which are brought together and secured under light tension in a suitable clamp 142 which is affixed on the supporting bracket 113.

In order to insure accurate positioning of the work carrier 14 at the proper level for coaction of its indexing lever 115 with the stop 124, there is affixed to the work carrier plate 83 a horizontal ledge member 143, adapted to ride up the cam surface 144 and onto the horizontal surface 145 of a cam member 146 fixed on the end plate 127 of the main frame.

*Work Supplying and Positioning Mechanism*

It will be apparent that each workpiece W may be manually mounted between the centers 15 and 16. However, this would result in considerable loss of time and reduction of output of the machine. In order to maintain a maximum output of the machine with minimum utilization of man power, the invention includes a work supplying and positioning mechanism which is associated in novel manner with the sawing machine proper.

Figure 17:
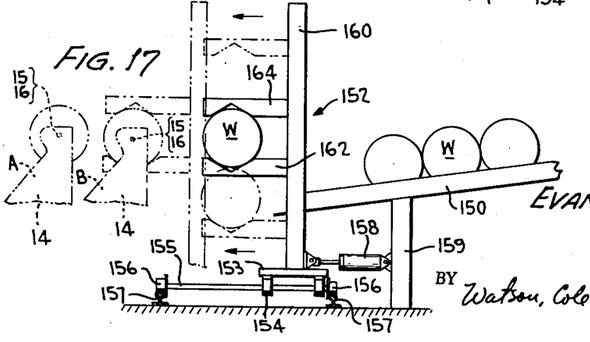
FIGURE 17 is an end elevation of the log delivering and centering mechanism, showing diagrammatically its manner of cooperation with the sawing machine proper, the latter being shown but fragmentarily, and in broken lines in different operative positions.
Figures 18, 19:
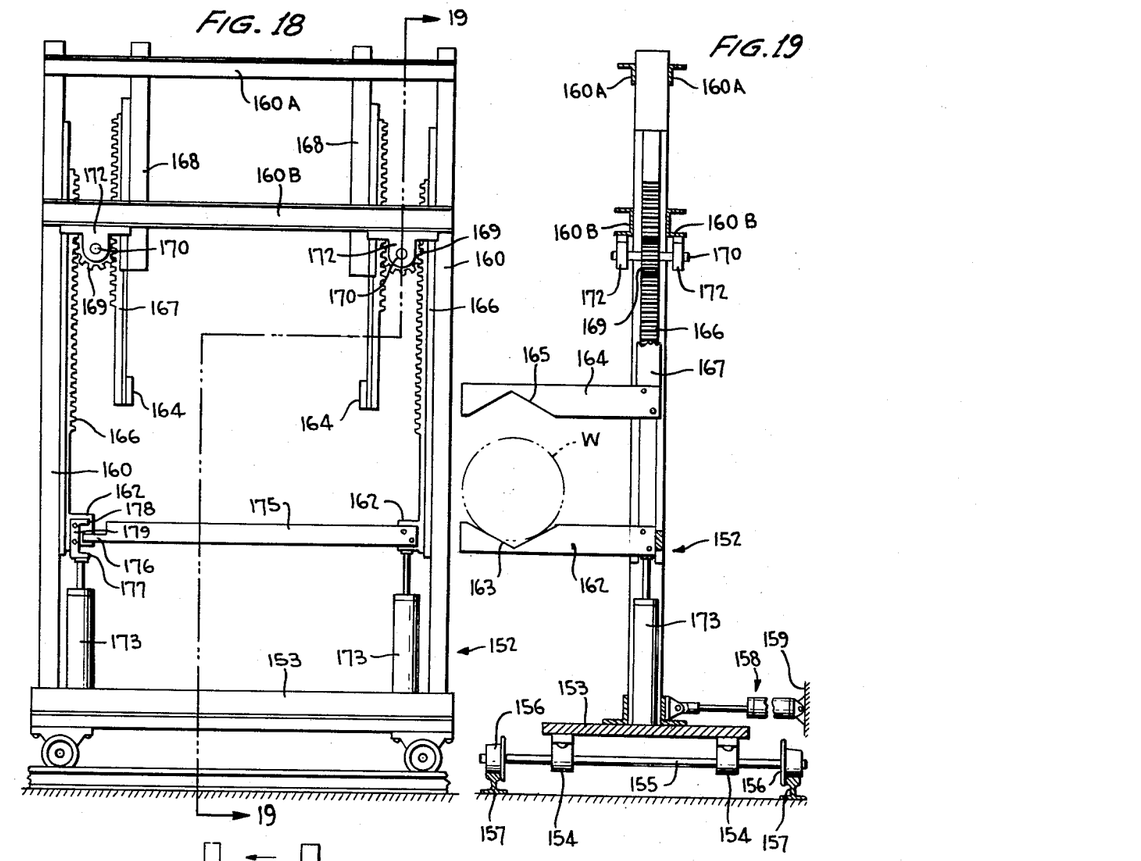
FIGURE 18 is a front elevation through the centering mechanism of the structure shown in FIGURE 17.
FIGURE 19 is a vertical section on the line 19—19 of FIGURE 18.

Such a mechanism is illustrated in FIGURES 17, 18 and 19. Referring first to FIGURE 17, as is diagrammatically illustrated in that figure, the supply of logs W may normally be delivered through an inclined chute 150 to the positioning mechanism generally designated 152 by which they are individually received and elevated automatically to a height at which the longitudinal axis of each log W is accurately positioned in a horizontal plane common to the indexing axis of the sawing machine and parallel to said axis.

In order that the logs carried by the supporting mechanism 152 may be accurately positioned longitudinally of their axes for accurate reception between the work supporting centers 15 and 16 of the sawing machine, the entire positioning mechanism 152 is mounted on a small truck 153 having bearings 154 through which are both slidably and rotatably journaled the axles 155 on which are disposed the flanged wheels 156 to support and guide the mechanism 152 for bodily movement along the rails 157, parallel to the saw tube 10 and to the indexing axis of the sawing machine.

Normally the truck 153 will have to be moved along the rails 157 only for a very short distance such as an inch or a fraction thereof to position workpieces between their supporting centers on the sawing machine, and this may be accomplished either manually or through the use of suitable lever means (not shown) fulcrumed to a fixed support adjacent the rails 157 and having a pivoted connection with the truck 153 so that swinging of the lever in a longitudinal plane may achieve the desired longitudinal adjustment of the truck 153.

In order that the work positioning mechanism 152 may serve to carry the logs or workpieces W transversely from the chute 150 for reception in the work support 14 of the sawing machine, a fluid actuated cylinder and piston unit of the reversible or double acting type 158 is operatively connected between the supporting frame structure 159 of the chute 150 and the truck 153 in such manner as to urge the truck 153 and mechanism 152 transversely along the axles 155. This is permitted by the extended length of the axles as well as the longitudinal sliding connection between the axles and the truck afforded by the bearings 154.

The actual log receiving and supporting means which is carried by a rigid upright frame structure, including the upright 160 fixed in spaced relation on the truck 153 and interconnected by the rigid cross bars 160A and 160B, comprises essentially relatively longitudinally spaced pairs of opposite vertically moving clamp members. Each pair of said members is identical, comprising a lower horizontal member 162 defining an upwardly opening V-shaped notch 163, with the apexes of the respective notches 163 longitudinally aligned in a vertical plane parallel to the indexing axis and to the rotational axis of the saw tube 10. The upper member 164 of each said pair of clamp members similarly extends horizontally and may be provided with a downwardly opening V-shaped notch 165, with the apexes of the respective notches 165 aligned similarly to those of the notches 163.

Each lower clamp member or jaw 162 is rigidly affixed to and carried by a slide in the form of a rack bar 166 which is guided for vertical movement in the rigid frame, preferably by one of the frame uprights 160. Each upper clamp member 164 is similarly rigidly affixed to and carried by a rack bar 167 guided also for vertical movement in the frame structure, preferably by way of a vertical guide or trackway 168 supported between the frame crosspieces 160A and 160B. The rack bars 166 and 167 of each pair, and of course the clamp members 162 and 164, respectively, are interconnected through a pinion 169 for relatively equal and opposite vertical movement symmetrically to a horizontal plane which also is common to and includes the indexing axis defined by the work supporting centers 15 and 16 of the sawing machine. In the illustrated embodiment each pinion 169 has its shaft 170 rotatably supported by bearings 172 fixed to the frame cross members 162.

For actuating the respective pairs of clamping members 162 and 164 to grip and center and/or to release the workpieces as desired, the double acting fluid actuated cylinder and piston unit 173 is interconnected between the truck 153 and its associated lower clamp member 162. It is desirable to thus provide separate actuating means 173 for the respective pairs of clamp members 162 and 164 in order to compensate for the fact that the opposite ends of a given log may be of different diameters and it will therefore be necessary to effect a greater degree of closing movement of the clamp members 162 and 164 at the smaller diameter end of the log than of those at the larger end, in order that the longitudinal center line or axis of the log at its smaller end may be raised to the same level as that at its larger end. For this reason the respective pairs of clamp members may be either completely independent of each other or may if desired be interconnected only through a lost motion connection such as is defined by the horizontal bar 175 affixed to the lower clamp member 162 of one pair of clamps with its free end portion 176 disposed for lost motion between the lower and upper stop abutments 177 and 178 afforded by bracket 179 affixed to the other said lower clamp member 162.

Since the plane of symmetry with respect to which the upper and lower clamps 162 and 164 of each pair move remains constant, and is at the level of the axes of the tubular saw 10 and the work supporting centers 15 and 16 of the sawing machine, it will be apparent that when the upper and lower clamps of the two pairs are brought together to the full extent permitted by the log W, regardless of discrepancies in the diameters of the opposite ends of the log, this will result in the major axis or center line of the log being positioned substantially at the level of and parallel to the indexing axis defined by the work centers 15 and 16 of the work support 14. The full line showing of the clamps in FIGURE 17, together with the workpiece W disposed between them fully illustrates this.

For proper positioning of the log in the sawing machine, the sawing machine and the positioning mechanism are positioned and related in such a manner that in the fully laterally projected positions of the work support 14 and work positioning mechanism 152 toward each other, as indicated in broken lines in FIGURE 17, the apexes of the clamp member notches 163-165 and thus of the axis of a log supported therein will lie in a vertical plane containing the work supporting centers 15 and 16 in the position which the centers and their work support 14 assume when projected away from the tubular saw 10 with the ends of the guides or bearing sleeves 85 and 86 abutting against the longitudinal member 84 of the feed carriage frame.

In the operation of the work supplying and positioning means of the invention, the work positioning mechanism 152 is positioned adjacent the chute 150 in the manner shown in full lines in FIGURE 17, whereupon a log W may be rolled down the chute and onto the lower clamp members 162 for reception in the longitudinally aligned notches thereof, the clamp members 162 being at this time in their lowered positions. The entire truck 153 and work positioning mechanism 152 is then moved transversely along the axles 155 to its fully projected position toward the sawing machine work support 14, as indicated in broken lines in FIGURE 17, and the cylinder and piston units 173 are energized to raise the lower clamp members 162 until their upward movement is limited and terminated by engagement of the descending upper clamp members 164 with the opposite end portions of the log W. At this time obviously the axis of the log will be parallel to and at the level of the indexing axis of work support 14.

The work support 14 is fully projected away from the saw tube 10 from substantially the operative position indicated by the letter A in FIGURE 17 to the fully projected position designated by the letter B, at which time the indexing axis 15, 16 will substantially coincide with the longitudinal axis of the log W. During the movement of the parts to these positions, work supporting centers 15 and 16 will be relatively retracted or spread apart and the log may be bodily shifted in an axial direction by movement of the truck 153 along the rails 157 as necessary to guide it for proper reception between the centers 15 and 16. However, once it is received between the centers with its axis generally coinciding with the axis of the said centers, the latter may be relatively moved toward each other and into engagement with the ends of the log, whereupon the upper and lower clamp members 162 and 164 of each pair will be moved apart in obvious manner, and the entire mechanism 152 will then be returned by actuation of the hydraulic cylinder unit 158 to the position indicated in full lines in FIGURE 17.

*Operation*

The overall operation of the sawing machine is as follows:

With the feeding carriage 12 fully retracted to the front of the machine as in FIGURE 12, and with the work supporting centers 15 and 16 fully separated, the work carrier or holder 14 is transversely projected away from the tube saw to place the centers in predetermined position for reception of a log from the log supplying and positioning mechanism of FIGURES 17-20.

This latter mechanism then is actuated to place a log between the work centers 15, 16 with its major axis substantially aligned therewith, following which the centers are brought toward each other relatively and into engagement with the log to support the log for rotary indexing movement about the indexing axis defined by said centers.

The gauging plate 96 is raised to operative position while the work support is returned transversely toward the rotational axis of tube saw 10 until its movement is arrested by engagement of the log W with the gauging plate. The pneumatic cylinder 92 which governs the movement of the work support 14 is then actuated to hold the work support stationary in this position during subsequent operations on the particular workpiece. It will be seen that in this position the longitudinal projections of the saw teeth 11 will fall just within the periphery of the log. Thus the initial or outer circle of cuts to be made in the log will be inscribed within a circle of the greatest possible diameter permitted by the dimensions of the log.

The slotter saw cylinder 63, then is operated to project the slotter saw 54 to an operative position in which it intersects the longitudinal projections of the tubular saw teeth 11 just in advance of the tube saw, so that on the feeding movement of the carriage 12 and the log W it will form a longitudinal slot 54' (FIGURE 10) in the log which communicates radially with the cylindrical hollow to be formed by the tube saw. This slot functions to permit discharge of sawdust on the initial cut of the saw and, where a magnetic bearing 52 is employed, also provides clearance for the log to move past said bearing.

As the carriage 12 is moved through its feed stroke by action of the pneumatic cylinder to feed the log onto the saw, there is formed the initial billet or wooden round B indicated by the broken lines in FIGURE 10. While it is contemplated that the feeding of the carriage will normally be produced primarily by the pneumatic piston and cylinder unit 37, this will be supplemented by the thrust against the workpiece of the ejector plunger 68 which normally will have its cylinder 72 energized substantially simultaneously the carriage feeding cylinder. Since this ejector plunger 68 moves in axial alignment with the saw tube 10, it will be seen that as the saw completes its passage through the log the pressure of the ejector 68 on the log causes its teeth 68' to bite into the end of the log to prevent the completely severed round B from rotating with the tube while acting to expel the round through the open rear end of the tube for delivery between the extractor rolls 69, 70. The completed rounds B are successively discharged rearwardly from these rolls into a suitable bin or receiver not shown.

Following the completion of the first wooden round or billet B, the feed carriage 12 is retracted to its starting position in order to withdraw the log W from the saw tube for indexing it to proper position for the succeeding cut of the saw. When the carriage is thus fully retracted the indexing lever 115 of the work holder 14 will be operatively positioned with respect to the fixed stop 124 carried by the stationary saw frame, all as is evident from FIGURE 12. As is shown in FIGURES 12 and 13, the actuating cylinder 118 of the indexing mechanism is then retracted from its illustrated position to commence its upward operative stroke. During the first part of its stroke its lost motion connection 122, 123 with the lever 115 delays the commencement of the angular indexing movement of the indexing shaft 109 and workpiece until after the lower end of the piston rod has been sufficiently retracted from the brake pedal 137 to permit release of the brake band 133 by its spring 135. After the brake is released and the lost motion is taken up by travel of the pin 122 to the end of the slot 123 within the lever, the angular motion of the lever 115 will cause a similar motion of the indexing shaft 109 and work center 16. The extent of this angular movement will be determined by engagement of the lever 115 with the opposed surface 130 of the fixed stop 124. Since the fixed stop and/or the cam lever will have cam surfaces 130, 131 sloping in the direction of transverse movement of the work support 14, the angular movement will vary with the transverse position of the work support as determined by the diameter of the log which at any given time constitutes the workpiece. As earlier mentioned, the cam surface or surfaces 130, 131 are so arranged as to vary the angular indexing increments inversely with respect to the variations in the distance between the indexing axis and the saw tube axis.

Further these cam surfaces will preferably be arranged so that the angular indexing movement will be regulated to form the several rounds adjacent the periphery of the log as closely to each other as possible and in such manner that the annular kerfs cut by the saw teeth will intersect, without however permitting any preceding cut to extend past the inner periphery of the tube saw, it being apparent that this would result in malformation of the rounds or billets.

Thus by successively making fresh cuts C and indexing the log between cuts there will be provided a circular series of cuts C, as indicated in FIGURE 11, which will be continued to form a substantially complete circle of cuts about the indexing axis. If the log is of sufficient diameter, a further ring or rings of cuts may then be made in the same log after first shifting the work carrier or support 18 to bring the indexing axis to a shorter radius in each instance with respect to the rotational axis of the tubular saw. In such case the automatic increment adjusting mechanism earlier described will be seen to function to increase the angular indexing increments as required to maintain proper spacing between the various cuts as whatever shorter radius they might be formed about the indexing axis.

Obviously the various cylinder and piston means will be controlled by usual conventional means and in proper sequence.

The invention having thus been fully illustrated and described in its preferred embodiment, what is claimed as new is:

1. A wood sawing machine comprising
   (a) a stationary frame,
   (b) a saw tube mounted for rotation about a fixed axis on said frame, said tube having axially presented saw teeth at one end,
   (c) a carriage movable along said frame parallel to said axis,
   (d) a work holder mounted on said carriage for rectilinear adjustment transversely to said axis,
   (e) said work holder including means for rotatably supporting a workpiece for indexing movement about an indexing axis parallel to but displaced transversely from the rotational axis of the saw tube,
   (f) indexing mechanism on said work holder including an indexing element rotatable about said indexing axis and adapted for rotary driving engagement with the workpiece to transmit indexing movement thereto,
   (g) a driving element supported on said machine for movement through an operative stroke and a return stroke,
   (h) a unidirectionally operative coupling interconnecting said driving element and indexing element to transmit rotary indexing movement to said indexing element on each operative stroke of said driving element,
   (i) and means for varying the length of said operative stroke of the driving element responsive to variations in the transverse position of said work holder.

2. A wood sawing machine as defined in claim 1, in which said last mentioned means varies the length of the operative stroke of the driving element inversely with respect to variations in the distance between said indexing axis and the rotational axis of said saw tube.

3. A wood sawing machine as defined in claim 1, including power means operatively connected with said driving element for imparting the driving and return strokes thereto.

4. In a wood sawing machine of the class in which the workpiece is fed into operative engagement with the saw by a reciprocating feed carriage, the combination with said carriage of a work holder disposed on the carriage for movement transversely to the reciprocation of the carriage, means on the work holder for rotatably supporting a workpiece for angular indexing movement about an indexing axis parallel to said reciprocation, and means for effecting said indexing in predetermined increments that are varied in angular extent with in accordance with the transverse position of said work holder on the carriage.

5. In a wood sawing machine of the class in which the workpiece is fed into operative engagement with the saw by a reciprocating feed carriage, the combination with said carriage of a work holder disposed on the carriage for movement transversely to the reciprocation of the carriage, means on the work holder for rotatably supporting a workpiece for angular indexing movement about an indexing axis parallel to said reciprocation, and power means on the work holder for effecting said indexing in predetermined increments, said power means comprising an indexing element rotatable about said indexing axis and adapted for rotary driving engagement with said workpiece to transmit indexing movement thereto, a driving element supported on the work holder for operative movement through an operative stroke and a return stroke, a unidirectionally operative coupling transmitting movement from said driving element to the indexing element on each operative stroke only of the driving element, and stationary means on said machine for varying the length of said operative stroke of the driving element responsive to variation in the transverse position of said work holder.

6. A machine as defined in claim 5, in which said driving element is a lever oscillatable on said work holder, and said coupling is a one-way rotary clutch having a driving member operatively connected to said lever for oscillation therewith, and a driven member fixed to said indexing element.

7. A wood sawing machine as defined in claim 1, including a releasable braking means for restraining said indexing element against angular indexing movement, said driving element being operatively connected to said braking means to actuate same at the end of each return stroke and to release same during the first part of each operative stroke.

8. A wood sawing machine as defined in claim 7, in which said driving element has a lost motion connection with said indexing element, permitting sufficient free movement of said driving element at the inception of each operative stroke to release said braking means before indexing movement is transmitted to the indexing element.

9. A wood sawing machine as defined in claim 8, including yieldable holding means for restraining the indexing element against rotation during the return stroke of said driving element.

10. The combination defined in claim 1, in which said means for varying the operative stroke of the driving element comprises a stationary cam and means fixedly supporting same in the path of said operative stroke of the driving element, said cam having an operative cam surface sloping relative to the transverse movement of the work holder.

11. The combination defined in claim 1, in which said driving element is a lever swingable about a fixed axis on the work holder, and said means for varying the length of the operative stroke of the driving element comprises a stop, means fixedly supporting same in the path of movement of the lever, said lever being swingable in a plane parallel to the transverse movement of the work holder and being formed with a cam surface for abutting engagement with said stop.

12. The combination defined in claim 11, in which said stop also is formed with a cam surface for abutting engagement with said lever.

13. In a device of the character described, a work holder for rotatably supporting a workpiece for angular movement about an indexing axis, means supporting said work holder for adjustment transversely to said axis, indexing mechanism on said work holder including an indexing element rotatable about said axis and adapted for rotary driving engagement with the workpiece, a driving element supported on said device for movement through an operative stroke and a return stroke, a unidirectionally operative coupling interconnecting said driving element and said indexing element to transmit rotary indexing movement to said indexing element on each operative stroke of said driving element, and means for varying the length of said operative stroke responsive to variations in the transverse adjustment of said work holder.

14. The combination as defined in claim 13, including a releasable braking means for restraining said indexing element against angular indexing movement, said driving element being operatively connected to said braking means to actuate same at the conclusion of each operative stroke and to release same at the inception of each operative stroke.

15. A work sawing machine comprising a stationary frame, a saw tube supported on said frame for rotation about its tubular axis, said tube having axially presented saw teeth at one end, a carriage movable along said frame parallel to said axis for feeding a workpiece axially onto said saw tube, a double acting pneumatic piston and cylinder unit supported on the carriage in axial alignment with said saw tube, said unit including an ejection piston having an ejection plunger connected thereto for axial movement into and from said saw tube, said piston and plunger being formed with a restricted axial passage extending completely therethrough, a supply line communicating with said cylinder for supplying fluid under pressure into same for urging said plunger and piston unit on its operative stroke to project said plunger into the saw tube whereby it may engage and axially eject a billet formed in said tube, said billet serving to obstruct the discharge end of said passage, a check valve in said supply line for preventing back flow of fluid therethrough from the cylinder, and means for causing a retraction stroke of said plunger and piston, thereby expelling the said fluid through said piston and plunger into said saw tube throughout the withdrawal movement of said plunger from the tube.

16. A wood sawing machine as defined in claim 15, including means for delivering a mixture of compressed air and lubricant into said cylinder for projecting said plunger on its operative stroke.

17. A wood sawing machine as defined in claim 15, including an auxiliary ejection plunger sleeve coaxially slidably receiving said piston rod, and power means on the machine for projecting said sleeve axially into the saw tube for abutting engagement with a billet formed therein.

18. A wood sawing machine as defined in claim 17, including means independent of the ejecting plunger supporting said sleeve for axial movement and against rotary movement, and sharpened axial projections on the end of said sleeve for engaging the billet and restraining the same against rotation with the saw tube.

19. In a saw tube having an annular series of axially directed saw teeth at its cutting end, the improvement in accordance with which said teeth present generally radial cutting edges having their radially inner ends disposed for rotation in a circular path concentric with and of lesser diameter than the saw teeth, and means adjacent the bases of the respective saw teeth defining an annular sawdust barrier of an internal diameter substantially equal to that of the said circular path for minimizing the axial passage of sawdust into the tube.

20. The structure as defined in claim 19, in which the said barrier defining means comprises a plurality of radially inwardly projecting barrier segments extending around and contiguous to the notches between adjoining teeth.

21. The structure defined in claim 20, in which said segments are integral with the respective teeth, and of maximum radial thickness near the bases of the teeth whereby to strengthen the same.

22. In a sawing machine of the class in which the workpiece is fed into operative engagement with the saw by a rectilinearly and horizontally movable work holder with means on the work holder for supporting the workpiece for angular indexing movement on a horizontal indexing axis parallel to said rectilinear movement, a work positioning mechanism and means supporting and guiding same for movement and shiftable transversely with respect thereto and with means for causing such angular indexing movement in increments related to the transverse shifting of said supporting means with respect to said rectilinear movement parallel to that of said means on the work holder, further means supporting said mechanism for transverse movement relatively toward and away from said indexing axis, said mechanism including two pairs of work clamping members relatively spaced in a direction parallel to said indexing axis, each said pair including upper and lower members, and means interconnecting said members of each pair for relatively equal and opposite vertical movement with respect to a horizontal plane of symmetry containing said indexing axis.

23. The combination of claim 22, in which the lower clamping members of each said pair define upwardly opening V-notches having their apexes relatively aligned in a direction parallel to said indexing axis.

24. The combination defined in claim 22, including separate power means for actuating the respective pairs of clamping members independently of each other.

25. The combination defined in claim 22, in which said work positioning mechanism includes means supporting it for bodily transverse movement into and from a position in which the axis of a generally cylindrical workpiece supported in the said pairs of clamping members substantially coincides with the said indexing axis.

26. The combination defined in claim 22, including means for relatively moving the said work supporting means and the said work positioning means to positions in which said indexing axis substantially coincides with the cylindrical axis of a generally cylindrical workpiece jointly supported in the respective pairs of clamp members.

27. The combination defined in claim 22, including means guiding said work positioning mechanism for movement in a direction parallel to said indexing axis for entering with respect to said means on the work holder for supporting the workpiece.

28. In a wood sawing machine of the type incorporating means for causing relative feeding movement of a workpiece and a saw, the combination with said means of a work holder movable transversely with respect to the direction of sawing and arranged to support said workpiece rotatably for indexing about an axis parallel with the direction of sawing, and means for causing such indexing of a workpiece supported by said work holder in increments related to the transverse position of said work holder with respect to the sawing direction.

29. In a device of the character described, an indexing element formed for engaging a workpiece and supported for movement about a transversely shiftable indexing axis, drive means operable through an active stroke to cause movement of said indexing element about said indexing axis and through a recovery stroke without affecting said indexing element, and means acting at said drive means for varying the caused extent of movement of said indexing element in relation to the transverse position of said shiftable indexing axis.

30. A device of the character described for cutting cylindrical billets of substantial length from a rough wooden workpiece such as a log section, said device comprising an elongated tubular saw mounted for rotation about its tubular axis, drive means to rotate said tubular saw for cutting action, means for supporting said workpiece adjacently so that it is rotatably held for progressive positioning about an indexing axis parallel with and selectively shiftable in transverse relation to the tubular axis of said saw, means for causing relative feeding and recovery movement of said tubular saw and supporting means in the direction of said tubular saw axis to apply said saw for cutting a billet from said workpiece and then withdrawing the saw and the cut billet therefrom, means for progressively positioning said workpiece about said indexing axis at any transverse position thereof so that the workpiece is held by said supporting means for cutting each successive billet therefrom in a fixed relation to the void left upon withdrawal of a previously cut billet.

31. A device as defined in claim 30 and further characterized in that means is additionally provided for initially receiving and positioning said workpiece so that the lengthwise axis thereof is disposed substantially parallel with said indexing axis in preparation for supporting engagement by said supporting means.

32. A device as defined in claim 31 and further characterized in that said additionally provided means comprises two pairs of slide members respectively guided for movement to position said workpiece, means interconnecting the slide members of each of said pairs for equal and opposite movement in symmetrical relation to an axis parallel with said indexing axis, a workpiece clamp member carried by each slide member of said pairs with the clamp members carried by at least one slide member of each pair having V-notches aligned therein with respect to said parallel axis and disposed for workpiece positioning action in opposition to the clamp member pair therewith, and means for causing movement of the clamp members of each pair.

References Cited in the file of this patent

UNITED STATES PATENTS

| | | |
|---|---|---|
| 1,569 | Lockhart | 1854 |
| 802,184 | Farnum | Oct. 17, 1905 |
| 1,646,115 | Sjostrom | Oct. 18, 1927 |
| 2,741,278 | McMurtrie | Apr. 10, 1956 |

FOREIGN PATENTS

| | | |
|---|---|---|
| 845,170 | Great Britain | Aug. 17, 1960 |

UNITED STATES PATENT OFFICE
CERTIFICATE OF CORRECTION

Patent No. 3,163,190                            December 29, 1964

Evander M. Ervin

It is hereby certified that error appears in the above numbered patent requiring correction and that the said Letters Patent should read as corrected below.

Column 1, line 51, for "matter" read -- manner --; line 57, for "embodimen" read -- embodiment --; column 2, line 12, for "muts" read -- cuts --; column 4, line 54, for "driven" read -- drive --; column 7, lines 13 and 14, strike out "horizontal shelf 57 fashion" and insert instead -- shelf 57 in horizontal fashion --; column 20, lines 62 to 67, strike out ", a work positioning mechanism and means supporting and guiding same for movement and shiftable transversely with respect thereto and with means for causing such angular indexing movement in increments related to the transverse shifting of said supporting means with respect to said rectilinear" and insert instead -- and shiftable transversely with respect thereto and with means for causing said angular indexing movement in increments related to the transverse shifting of said supporting means with respect to said rectilinear movement, a work positioning mechanism and means supporting and guiding same for --; column 21, line 25, for "entering" read -- centering --; column 22, line 42, strike out "1,569      Lockhart ---------- 1854"; line 47, insert -- 1,569      Great Britain ------- 1854 --.

Signed and sealed this 13th day of July 1965.

(SEAL)
Attest:

ERNEST W. SWIDER
Attesting Officer

EDWARD J. BRENNER
Commissioner of Patents